Oct. 29, 1929. G. H. HUFFERD ET AL 1,733,599
STEERING JOINT ASSEMBLY
Filed March 13, 1926
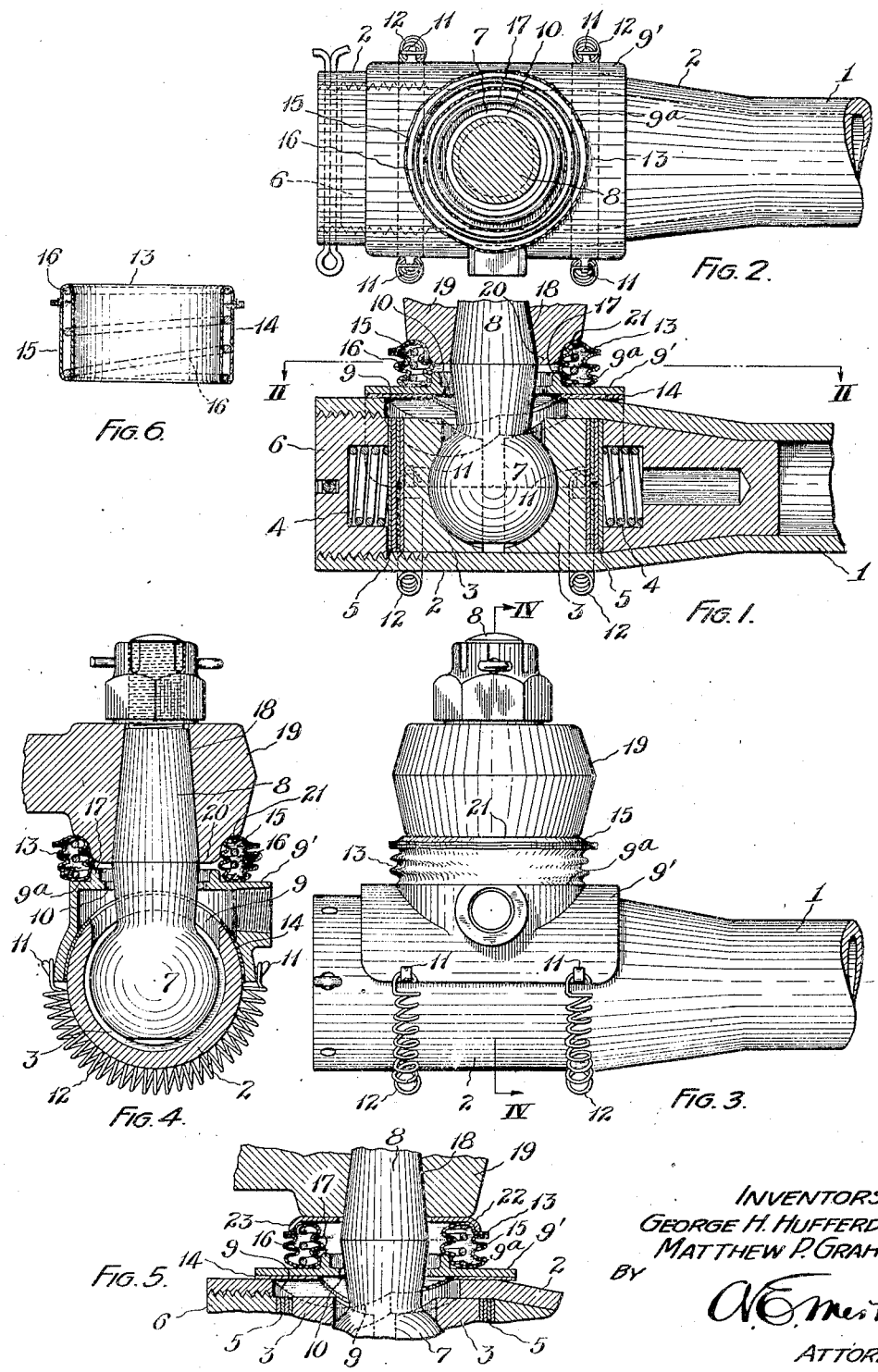
INVENTORS:
GEORGE H. HUFFERD
MATTHEW P. GRAHAM
BY
ATTORNEY Patented Oct. 29, 1929

1,733,599

UNITED STATES PATENT OFFICE

GEORGE H. HUFFERD AND MATTHEW P. GRAHAM, OF DETROIT, MICHIGAN, ASSIGNORS TO THOMPSON PRODUCTS INC., OF CLEVELAND, OHIO, A CORPORATION OF OHIO

STEERING-JOINT ASSEMBLY

Application filed March 13, 1926. Serial No. 94,538.

Our invention relates to steering joint assemblies such as are used for example in the steering mechanism of motor vehicles.

Its object is to provide a structure of the above class so arranged that it will be substantially dust-proof and which may be readily assembled or dismounted and which will be economical of manufacture and efficient in its operation.

A particular feature of our invention comprises a compressible dust-excluding washer which forms one element in the combination of parts comprising another feature of the invention.

The said invention consists of means hereinafter fully described and particularly set forth in the claims.

The annexed drawing and the following description set forth in detail certain means for carrying out my invention, the disclosed means, however, constituting but some of the various mechanical forms in which the principle of our invention may be employed.

In said annexed drawing:

Figure 1 represents an axial section (partly in elevation) of a joint formed between the reach or tie-rod of a motor vehicle and a steering knuckle, and embodying the various features of our invention.

Fig. 2 represents a section taken upon the plane indicated by the line II—II, Fig. 1.

Fig. 3 represents a front elevation of the structure.

Fig. 4 represents a section (partly in elevation) taken upon the plane indicated by line IV—IV, Fig. 3.

Fig. 5 represents a fragmentary section similar to that of Fig. 1, showing a modified form of the structure.

Fig. 6 represents a fragmentary portion of the dust washer in the distended form which it assumes when not forming a part of the complete assembly.

The illustrated embodiment of our invention shows same as applied to one end of a tie or reach-rod and steering-knuckle connection of a motor vehicle and includes a tie or reach-rod I formed with an enlarged end socket 2 in which are bearing blocks 3, springs 4, shims 5 and an end plug 6, all of which cooperate to form a tight, non-rattling ball-bearing for the ball-journal 7 of a stud 8 which projects through an aperture 9 formed in the socket, all as had heretofore been common practice.

In our improved construction, however, we provide a metal cap 9' of semi-cylindrical shell form which is provided with an aperture 10 through which the stud 8 projects, and upon each of its opposite ends with a pair of lugs 11, Fig. 3. To the latter are attached the ends of two coiled springs 12—12, which pass around the opposite side of the socket and are in tension, so as to hold the cap 9' securely in place.

The central or apertured portion of the cap is made flat and circular so as to form a seat $9^a$ for a dust-washer 13 of peculiar construction and which forms one of the features of our invention. A thin felt or leather washer 14 is interposed between the cylindrical surfaces of the cap and sockets, Figs. 1 and 4.

The dust-washer 13 consists of an envelope 15 made of suitable strong and flexible dust-proof fabric such as chrome tanned leather of cylindrical form, having a hollow annular cross-section, and closed at both ends. In this envelope is a coiled spring 16 in a state of such compression that when the washer is not in use, the spring-ends will engage the inner ends of the envelope and distend same, as shown in Fig. 6.

The aperture 10 is preferably surrounded by a flange 17, which is of a diameter such that it will fit into the interior of the washer 13 and hold the adjacent end of same in place.

The outer end portion of the stud 8 is formed with the usual tapered journal surface 18 upon which is seated the bearing surface of the steering-knuckle arm 19. That part of said arms opposite the cap 9' is formed with a boss 20 adapted to project into the interior of the dust washer 13 and an adjacent annular seat 21. The washer, as shown, is interposed between the arm 19 and the cap 9' in compressed condition so as to cause the soft ends of the envelope to closely engage the surfaces of the seats $9^a$ and 21 and thus exclude dust from the bearings of the various parts of the assembly.

In Fig. 5 we have shown a slight modification of the above-described construction, and in which a flanged plate 22 is provided and interposed between the spring arm and the adjacent end of the dust-washer 13, the flange 23 of said plate being made of sufficient diameter to receive and enclose the said washer.

What we claim is:

1. In a steering joint assembly, the combination of a steering member; a journal member having one end mounted on said steering member; a second steering member mounted upon said journal member; and a compressed dust-excluding member interposed between said two steering members and comprising an envelope of annular cross-section and an elastic member within said envelope adapted to distend the latter in a direction parallel to its axis.

2. In a steering joint assembly, the combination of a steering member having a hollow cylindrical end socket; a journal member having one end mounted in said socket and passing through an aperture therein; a second steering member mounted on said journal member; a semi-cylindrical cap surrounding said aperture and having an opening through which said journal member extends; means for resiliently holding said cap in place; and a compressed flexible dust-excluding means interposed between said journal member and cap and consisting of an envelope of annular cross section and made of flexible material, together with a coil-spring entirely enclosed within said envelope and coaxial therewith, whereby the envelope and spring may be compressed or extended in a direction parallel to its axis.

3. In combination, in a joint assembly, a first joint member, a movable member journaled in said joint member, a second joint member connected to said movable member, a cap element disposed on said first member and having an opening through which said movable member extends, means including a semi-circular spring encircling said first joint member and having its ends connected to said cap element for maintaining said cap element in tight cooperation with said first joint member, and a flexible dust excluding member interposed between said element and said second joint member including resilient means therein for expanding it so as to cause it to at all times fill a space between said first and second members.

Signed by us this 12th day of February, 1926.

MATTHEW P. GRAHAM.
GEORGE H. HUFFERD.